United States Patent Office 2,753,272
Patented July 3, 1956

2,753,272

IDENTIFICATION OF ARTIFICIAL FIBERS

Benjamin W. Collins, Swarthmore, Pa., assignor to American Viscose Corporation, Philadelphia, Pa., a corporation of Delaware No Drawing. Application April 30, 1953, Serial No. 352,281

12 Claims. (Cl. 106—165)

This invention relates to the manufacture of artificial fibers, films and other shaped bodies containing a boron whereby the material may be readily identified.

For many purposes, it is desirable to be able to identify a product comprising or containing synthetic fibers, films and the like as to origin and method of manufacture. It has been proposed to treat strands of yarn, rope and the like with a foreign substance such as a solution of a soluble compound which is not visible or apparent to the user of the product but which permits the manufacturer to identify the product by a predetermined color reaction upon subsequent treatment of the product. Such identification means is not entirely satisfactory where the shaped bodies are utilized in the production of other articles, for example, textile fabrics, because the identifying material is not permanent and may be removed during the normal use of the article. In the manufacture of synthetic fibers, films and the like, particularly those produced by regenerating cellulose from a cellulosic solution, the identifying material must be an insoluble material in order to withstand the numerous aqueous or other liquid treatments to which the fiber, film and the like is subjected during the formation of the fiber, and the possible subsequent liquid treatments such as washing, dry cleaning and the like during the normal usage of the products.

In my prior Patents 2,256,549 and 2,390,512, there is disclosed and claimed the use of insoluble compounds of various metals for the purposes of identifying artificial filaments and the like. These insoluble materials are introduced into the fiber-forming or filament-forming solution in the form of finely divided suspensions. Although these materials may be added in amounts up to about 1200 parts of the identifying substance per million parts of the finished product, they may be employed in amounts of between 1 part and 5 parts per million parts of the product.

The primary purpose of the present invention is to provide an ingredient of positively identifying synthetic fibers, films and the like.

Another purpose of this invention is to provide improved shaped bodies of organic filament-forming materials.

Other objects and advantages of this invention will become apparent from the description and claims which follow.

It has been discovered that elemental boron is particularly well adapted for identifying shaped bodies of organic filament-forming materials such as synthetic fibers, filaments, films and the like. Boron is highly resistant to the normal solutions employed in preparing the shaped bodies, for example, synthetic fibers, as well as to the usual washing and dry cleaning liquids and solvents employed during normal usage of textile fabrics and the like formed from such fibers. Although my prior patents disclose the use of boron compounds as identifying materials, it has been discovered that elemental boron possesses certain highly desirable advantages over the compounds. For identification purposes, it is necessary that the boron compounds be of high purity. I have discovered that the amounts of elemental boron required for positive identification of the synthetic fibers, filaments, films and the like is substantially less than the amounts of the boron compounds required for such identification. For purposes of spectrographic analysis, boron is particularly well suited for identification purposes because of the lack of any appreciable lines of interference of common metals which might be present in the shaped bodies by chance.

The elemental boron powder may be incorporated in the fiber-forming or film-forming solution or spinning liquid at any desired step in the production of the forming solution or spinning dope. Preferably, the boron is added during an early stage in the preparation of the forming solution or liquid so that it becomes intimately and thoroughly dispersed throughout the mass of the spinning liquid. The powder is preferably of such a state of sub-division that the largest particles are of the order of about 0.5 micron so as to permit the particles to pass through the usual filtration media and to prevent any blocking or contamination of the extrusion orifices. The boron powder is preferably added as a dispersion in a liquid which is compatible with the particular spinning liquid.

As is well known, the general appearance of artificial fibers, filaments and the like is not perceptibly altered until foreign materials are present in amounts of about 1200 parts per million parts of the fiber or filament material. Similarly, such amounts of boron powder may be added without effecting a perceptible change in the general appearance of the product. I have discovered, however, that for purposes of positively identifying the products, boron may be employed in amounts of from about 0.2 to about 0.5 part per million parts of the fiber or filament material. Because of the lack of interference lines of other common metals in spectrographic analysis, these infinitesimal amounts of boron are satisfactory for the purposes of positive identification. If desired, an additional identifying substance of the type disclosed in my prior patents may be intimately and thoroughly mixed with the elemental boron powder.

Boron may be satisfactorily employed for the identification of films and fibers of such organic materials as regenerated cellulose, cellulose ethers, cellulose esters, vinyl resins and other synthetic fiber and film-forming organic materials.

The use of boron for purposes of identifying rayon may be illustrated by reference to the preparation of rayon from viscose. Cellulose pulp may be steeped in a caustic soda solution and pressed in the usual manner. During the subsequent shredding operation, a dispersion of the elemental boron powder may be added to the pulp. The powder may be added in amounts of from about 0.01 gm. to about 0.02 gm. of boron per 100 lbs. of pulp. The shredded pulp is then treated with carbon bisulfide and the xanthate dissolved or dispersed in dilute caustic soda to form the usual viscose solution. After filtration and ripening in accordance with conventional practice, the viscose is extruded through spinnerets into a coagulating and regenerating bath and subsequently subjected to the conventional washing, desulfiding, bleaching and like liquid treatments and finally dried. If desired, the elemental boron powder may be added during the xanthate dissolving step.

The boron, since it is unaffected by the alkali of the viscose solution and insoluble in the treating liquids is permanently and uniformly distributed throughout the shaped body. The boron does not migrate nor is it removed by subsequent washing treatments or treatments with dry cleaning solvents. The products are readily identified by spectrographic analysis.

Although the specific example refers to the incorporation of boron in a viscose solution, it is apparent that it may be incorporated in a solution of other film-forming materials or it may be incorporated in a liquid film-forming material maintained at relatively high temperatures. The boron may be employed to identify fibers, filaments, films, coatings, yarns, threads and other shapes of the synthetic organic material. The term "organic film-forming liquid" is employed herein and in the claims to designate liquids, either a solution or dispersion or a molten liquid, of an organic material capable of forming fibers, filaments, films and the like.

I claim:

1. A spinning liquid capable of being formed into artificial filaments, yarns and other shaped bodies containing an organic film-forming material and, in an amount insufficient to change the perceptible appearance of the shaped body, from about 0.2 part to not more than 1200 parts of elemental boron per million parts of the organic film-forming material.

2. A spinning liquid as defined in claim 1, wherein the organic film-forming material comprises a cellulosic spinning solution.

3. A spinning liquid as defined in claim 1, wherein the organic film-forming material comprises viscose.

4. A spinning liquid capable of being formed into artificial filaments, yarns and other shaped bodies containing an organic film-forming material and from about 0.2 to about 0.5 part of elemental boron per million parts of the organic film-forming material.

5. A spinning liquid as defined in claim 4, wherein the organic film-forming material comprises a cellulosic spinning solution.

6. A spinning liquid as defined in claim 4, wherein the organic film-forming material comprises viscose.

7. As an article of manufacture, a shaped body comprising an organic film-forming material and from about 0.2 part to not more than 1200 parts of elemental boron per million parts of the organic material.

8. An article of manufacture as defined in claim 7, wherein the organic film-forming material consists of regenerated cellulose.

9. An article of manufacture as defined in claim 7, wherein the shaped body consists of filaments and the organic film-forming material consists of regenerated cellulose.

10. As an article of manufacture, a shaped body comprising an organic film-forming material and from about 0.2 to about 0.5 part of elemental boron per million parts of the organic material.

11. An article of manufacture as defined in claim 10, wherein the organic film-forming material consists of regenerated cellulose.

12. An article of manufacture as defined in claim 10, wherein the shaped body consists of filaments and the organic film-forming material consists of regenerated cellulose.

References Cited in the file of this patent

FOREIGN PATENTS 361,310    Great Britain _____ Nov. 18, 1931

OTHER REFERENCES

Smith's "Introduction to Inorganic Chemistry" (1915), p. 526.

Reinhold: "The Condensed Chemical Dictionary," 4th ed. (1950), p. 107.

Deming: "General Chemistry" (1923), p. 376.

Webster Dictionary, sec. unabridged (1950), p. 313.

Merck: "The Merck Index," 6th ed. Periodic chart of the elements inside front cover.